No. 813,582. PATENTED FEB. 27, 1906.
H. H. PORTER.
ELECTRIC STORAGE BATTERY.
APPLICATION FILED SEPT. 21, 1903.
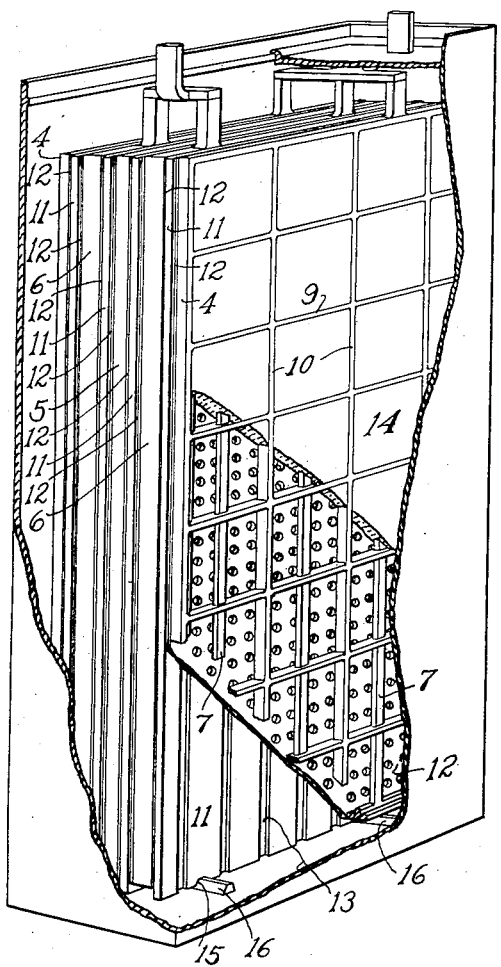
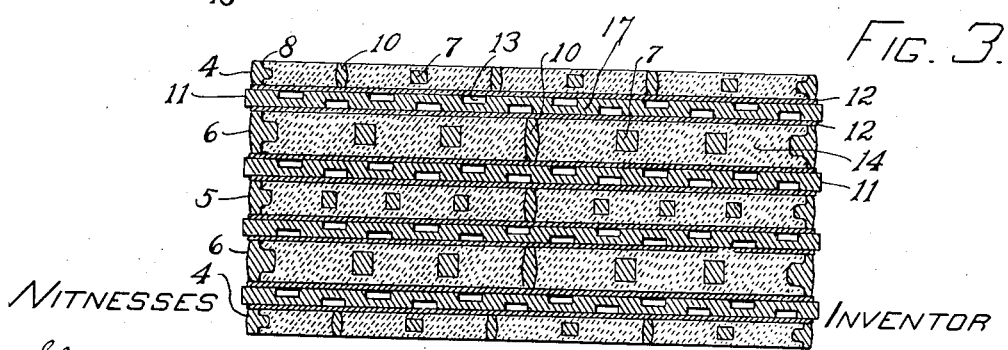

UNITED STATES PATENT OFFICE.

HARRIS HARDING PORTER, OF PROVIDENCE, RHODE ISLAND, ASSIGNOR TO RHODE ISLAND ELECTROMOBILE COMPANY, OF PROVIDENCE, RHODE ISLAND, A CORPORATION OF MAINE.

ELECTRIC STORAGE BATTERY.

No. 813,582.           Specification of Letters Patent.           Patented Feb. 27, 1906.

Application filed September 21, 1903. Serial No. 173,927.

*To all whom it may concern:*

Be it known that I, HARRIS HARDING PORTER, of Providence, in the county of Providence and State of Rhode Island, have invented certain new and useful Improvements in Electric Storage Batteries, of which the following is a specification.

The object of this invention is to provide a separator for secondary-battery plates which shall prevent short-circuiting and to the greatest possible extent disintegration of the battery.

Another object of this invention is to provide a separator which will permit the use of battery-plates having a very open grid and a maximum extent of active material exposed to the exciting liquid, the construction of the separator preventing the active material from falling away from the grid, while allowing free access of the exciting liquid to the active material.

Another object of this invention is to provide a separator which shall make the internal resistance of the battery equal throughout all parts thereof, shall be porous, sufficiently flexible to conform to the changes in the battery-plates from heat, expansion, &c., and yet bind the perforated non-conducting sheet firmly and evenly against the adjacent face of the battery-plate.

To accomplish these objects, I make my separator of a sheet or strip of wood having parallel plane portions and parallel grooves therein, arranged alternately on opposite sides thereof, the plane portions being substantially wider than the grooves which separate them and each said plane portion being directly opposite a groove on the other face of the sheet. This separator used by itself in conjunction with plates of secondary batteries is far superior to those with which I am acquainted and when used in connection with a perforated non-conducting sheet—say of hard rubber—presents the following decided advantages: It enables us to use a very open grid, giving a much greater amount of exposed active surface, and permits the use of a very thin separator and perforated sheet, thereby decreasing the internal resistance of the battery and increasing the output. Making the plane surfaces wider than the grooves, moreover, gives between the thin grooved portions of the separators solid vertical portions 17 of the full thickness of the separator, thereby insuring an equally-distributed internal resistance to pressure at all points in the battery and preventing unequal working of different portions of the plate-surfaces, for it will be readily seen that should the grooves be wider than the plane surfaces or even of the same width as said surfaces those portions of the separator marked 17 17 in Fig. 2 would be substantially absent, and the spaces now filled by such portions would be substantially empty spaces, which fulfil no useful purpose. On the other hand, omitting said portions 17 17 would therefore result in a weakening of the separator and in permitting the active material on expansion to press in the perforated sheet and allow the active material to fall down between the same and the separator, all as appears below. The greater width of the plane portions of the separator allows of its being made stronger and yet flexible enough to conform to changes in the state of the battery arising from heat, expansion of active material, or from any other cause, as above stated. In addition to the advantages enumerated above this separator accomplishes a result absolutely essential to the life and proper working of the battery and allows the employment in batteries exposed to hard usage, such as automobiling, of plates that cannot now be used. By this is meant plates whose external surface is practically all active material.

Unless the perforated non-conducting sheet is pressed and bound firmly and flatly against the active material there will result short-circuiting and deterioration. In my separator the relatively wide plane surfaces hold and bind the perforated sheet against the active material practically as flat and firmly as though the separator were a continuous flat surface, while at the same time the narrower grooves furnish vertical channels for the circulation of the exciting liquid and developed gases.

I do not wish to be understood as claiming herein wooden separators as such provided with vertical surfaces and grooves, but as claiming separators having plane surfaces substantially wider than the grooves, as set forth above.

In the drawings, Figure 1 is a perspective view of a battery, partly broken away, embodying my improvement. Fig. 2 is an enlarged cross-section illustrating the relative thickness of the plates and the arrangement of separators combined therewith. Fig. 3 is a perspective view of one of the positive pole-plates, the active material being omitted at one end to show the construction of the grid more perfectly.

The separators peculiar to my invention are employed with plates designed to reduce the weight of metallic lead in the grids and correspondingly increase the amount and surface exposure of active material held thereon by the separators. This reduction in the weight of the grids, not herein separately claimed, is in part accomplished by making the negative pole-plates 4 and 5 materially thinner than the positive pole-plates 6, the outermost negatives being, say, forty per cent. less and the intermediate negatives twenty per cent. less in thickness than the several positives. Furthermore, in all the lead grids the intermediate longitudinal bars 7 are of less thickness than their marginal frames 8 and transverse bars 9, such reduction in thickness reaching, preferably, an average of forty per cent. This leaves a substantial thickness of the active material covering and exposed to the electrolyte over such thinner bars, which are still of sufficient capacity to carry the current, while the frame and transverse bars resist the lateral pressure. I, however, leave one or more of the longitudinal bars, preferably the central one, 10, of full thickness to help bear the pressure and prevent buckling. In the thin outermost negatives 4 these bars are alternately thick and thin. The marginal frame-bars 8 of all the plates have an inwardly-extending rib midway between their edges, which helps support the active material. It is feasible and practicable in my battery to thus expose broad surfaces of the active material outside of the supporting frame-bars, because such material is held in place and protected against disintegration by my improved separators bearing laterally upon such surfaces, yet admitting the electrolyte thereto.

Between the successive plates of the battery I interpose three-ply separators comprising a middle layer 11 of wood deeply grooved vertically on opposite sides in alternate planes and a finely-perforated thin non-conducting sheet 12, preferably of hard rubber, each side of said layer and in immediate contact with the adjacent battery-plates. The wooden layers are by preference one-eighth inch thick, with grooves 13 an eighth inch wide, a sixteenth deep, and separated by seven-sixteenths of an inch of flat surface. When we use the specific shape of separator disclosed in Fig. 2, this gives in cross-section the effect of rectangular corrugation, with vertical channels 13 for the electrolyte and any gases to rise in, at the same time affording flat surfaces for the perforated sheets to bear against while they are pressed against the frame and thickest bars of the grids and the broad surfaces of active material 14 of the plates, such material being thus effectively kept from falling away. Such corrugation also affords appreciable relief from the pressure of expansion due to any cause in the use of the battery.

The wood separators 11 extend slightly beyond the edges of the several plates and materially below them at bottom in order to guard against short-circuiting. To accomplish this readily, I may form notches 15 in the lower edges of the wooden sheets at the points where plates and separators rest at bottom on raised ribs 16, formed on the bottom of the jar. These notches permit the wood separators to project beyond the other parts resting on said ribs. (See Fig. 1.)

I claim as my invention—

1. In a storage battery, a separating device for the successive plates, consisting of a thin layer of wood having parallel rectangular vertical grooves arranged alternately on its opposite sides, and, between them, relatively wide flat spaces, each such space being directly opposite a groove on the other face of said layer, such separator being notched at one end to receive the supporting-rib in the battery-jar whereby such separator may extend below the adjacent plates, to prevent short-circuiting, substantially as set forth.

2. In a storage battery, a separating device for the successive plates consisting of a thin layer of wood having parallel vertical grooves arranged alternately on its opposite sides, and, between them, plane surfaces substantially wider than said grooves, each such surface being directly opposite a groove on the other face of said layer.

3. In a storage battery, a separating device for the successive plates, consisting of a thin layer of wood having parallel vertical grooves arranged alternately on its opposite sides, and, between them, plane surfaces substantially wider than said grooves, each such surface being directly opposite a groove on the other face of said layer, in combination with a perforated sheet of non-conducting material, as and for the purpose set forth.

4. A porous separator for secondary-battery plates, having on its faces a series of flat surfaces and grooves, said surfaces being substantially wider than said grooves, and the surfaces on one face being opposite the grooves on the other face.

5. A porous separator for secondary batteries, having on each of its faces alternate plane surfaces and grooves, the plane surfaces being substantially wider than the grooves and the plane surfaces on one face being opposite grooves on the other.

6. The combination of a non-conducting perforated sheet adapted to hold the active material in position with a porous separator having on each of its faces alternate plane surfaces and grooves, the plane surfaces being substantially wider than the grooves.

7. The combination of a porous sheet adapted to maintain the active material in position, with a porous secondary-battery separator having on its face alternate plane surfaces and grooves, the plane surfaces being substantially wider than the grooves.

In testimony whereof I have affixed my signature in presence of two witnesses.

HARRIS HARDING PORTER.

Witnesses:
HENRY M. BOSS, Jr.,
LEONARD W. HORTON.